United States Patent
Hosur et al.

(10) Patent No.: US 6,331,975 B1
(45) Date of Patent: *Dec. 18, 2001

(54) USER DATA INDICATOR FOR DISCONTINUOUS TRANSMISSION

(75) Inventors: Srinath Hosur; Timothy M. Schmidl, both of Dallas; Anand G. Dabak, Richardson, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,510

(22) Filed: Oct. 28, 1998

(51) Int. Cl.[7] .............................. H04J 11/00; H04B 7/185; H04B 7/216; H04Q 7/20
(52) U.S. Cl. ...................... 370/342; 370/209; 370/210; 370/318; 370/335; 455/422; 455/437
(58) Field of Search ..................... 370/342, 335, 370/208, 209, 318, 210, 252, 491, 536; 455/67.1, 63, 67.3, 127, 422, 437, 522

(56) References Cited

U.S. PATENT DOCUMENTS

| | | | |
|---|---|---|---|
| 5,228,054 | | 7/1993 | Rueth et al. ............................ 375/1 |
| 5,619,491 | * | 4/1997 | Panzer .................................. 370/342 |
| 5,715,236 | * | 2/1998 | Gilhousen et al. ................... 370/209 |
| 5,768,254 | * | 6/1998 | Papadopoulos et al. ............ 370/201 |
| 5,799,011 | * | 8/1998 | LaRosa et al. ....................... 370/335 |
| 5,912,876 | * | 6/1999 | H'mimy ................................ 370/210 |
| 6,128,322 | * | 10/2000 | Rasanen et al. ..................... 370/536 |
| 6,137,991 | * | 10/2000 | Isaksson ............................. 455/67.1 |
| 6,166,622 | * | 12/2000 | Hosur et al. ......................... 340/318 |

OTHER PUBLICATIONS

"Performance of Pilot Symbol–Assisted Coherent Rake Receiver Using Weighted Multi–Slot Averaging for DS–CDMA Mobile Radio," Andoh, et al., Technical Report of IEICE, Aug. 1997, pp. 1–21 (English and Japanese).

"Experimental Performance of Coherent RAKE Receiver Using Weighted Multi–Slot Averaging Pilot Symbol Assisted Channel Estimation for DS–CDMA," Andoh, et al., Proceedings of IEICE, 1998, pp. 1–6 (English and Japanese).

"Flexible Power Allocation for Downlink DPCCH Fields", Tdoc SMG2 UMTS–LI 168/98, Nokia, '98, 9 sheets.

"DS–CDMA Pilot and Data Symbol–Assisted Coherent Multistage Interference Canceller Using Repeatedly Updated Channel Estimation", Sawahashi, et al., Proceedings of IEEE ICCS/ISPACS 1996, pp. 585–589.

"Pilot Assisted Coherent DS–CDMA Reverse–Link Communications with Optimal Robust Channel Estimation," Ling, Fuyun, Proceedings of ICASSP 1997.

"Multiuser Detection for Downlink CDMA Communications in Multipath Fading Channel", Wichman, et al., Proceedings of VTC '97, pp. 572–576.

(List continued on next page.)

Primary Examiner—Wellington Chin
Assistant Examiner—M. Phan
(74) Attorney, Agent, or Firm—Robert N. Rountree; Wade James Brady, III; Frederick J. Telecky, Jr.

(57) ABSTRACT

A communication circuit is designed with a processing circuit (11) coupled to receive a plurality of first control signals (40–45) and a second control signal (46) from a source external to the communication circuit during a predetermined time (49). The plurality of first control signals are equally spaced apart in time. The second control signal is proximate one of the first control signals (40). The processing circuit produces a power control signal in response to at least two of the plurality of first control signals. A serial circuit is coupled to receive the power control signal. The serial circuit produces the plurality of third control signals and the power control signal.

33 Claims, 2 Drawing Sheets

OTHER PUBLICATIONS

"Report On FPLMTS Radio Transmission Technology Special Group", (Round 2 Activity Report), Association of Radio Industries and Business (ARIB), FPLMTS Study Committee, Draft Version E1.1, Jan. 10, 1997, 223 pages.

"Proposed Wideband CDMA (W–CDMA)", Association of Radio Industries and Businesses (ARIB), Japan, Jan. 1997, 111 pages.

* cited by examiner

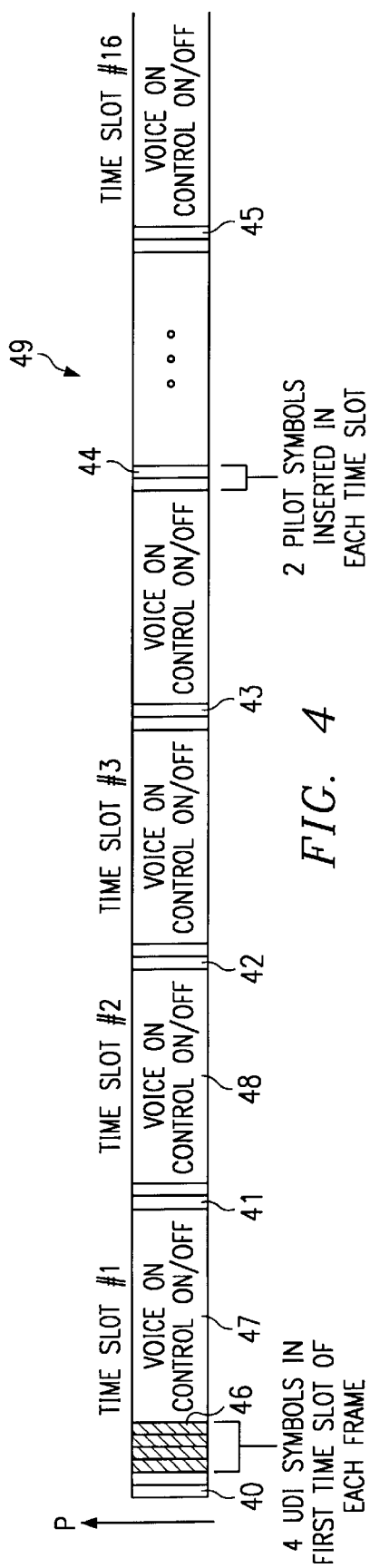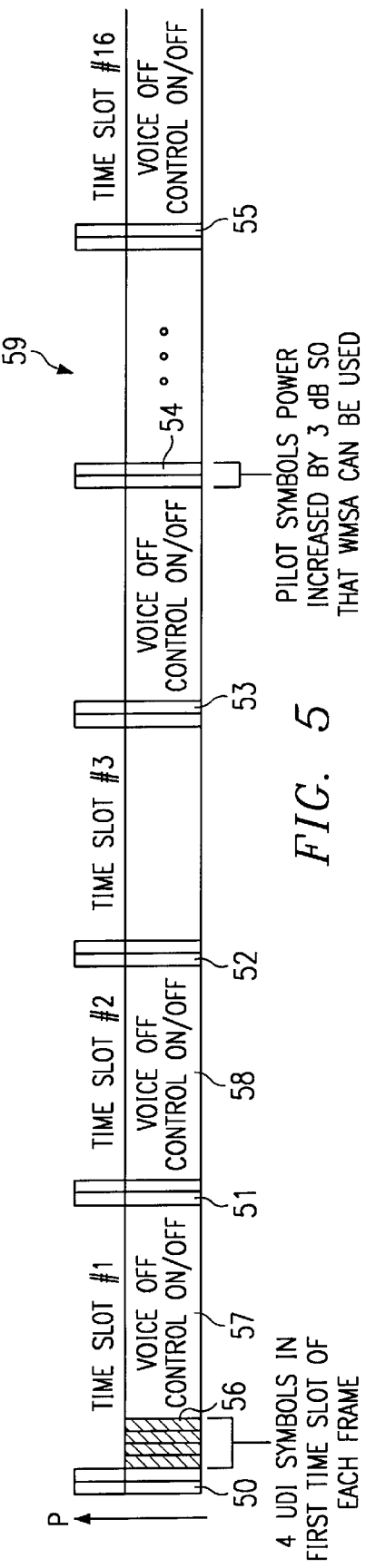

USER DATA INDICATOR FOR DISCONTINUOUS TRANSMISSION

FIELD OF THE INVENTION

This invention relates to wideband code division multiple access (WCDMA) for a communication system and more particularly to transmission and processing of user data identification (UDI) symbols.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. Patent Application No. 60/082,671, filed Apr. 22, 1998, and incorporated herein by reference. These WCDMA systems are' coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The pilot symbols are equally spaced in time among sixteen equal time slots within the frame. The received pilot symbols may then be compared to the known pilot symbols to estimate and correct the magnitude and phase distortion of the received data signal.

A problem arises, however, when no data signals are included with the pilot symbols in a frame. Since there is nothing in the frame to indicate a presence or absence of data signals, each time slot of the frame must be treated as if data signals are present. Thus, a channel estimate must be completed for the frame, and the contents of each time slot must be decoded. A cyclic redundancy check (CRC) is used to determine if data is received correctly. If the CRC falls, the ratio of the decoded data power to the pilot power is then calculated to determine if data was transmitted (for the purpose of calculating the frame error rate). This unnecessary decoding, CRC computation, and power ratio estimation when no data is present, however, requires extra computation power. Furthermore, even algorithms which use both data and pilot symbols for channel estimation will not be reliable if it is not known if data is present.

SUMMARY OF THE INVENTION

These problems are resolved by a communication circuit comprising a processing circuit coupled to receive a plurality of first control signals and a second control signal from a source external to the communication circuit during a predetermined time. The plurality of first control signals are equally spaced apart in time. The second control signal is proximate one of the first control signals. The processing circuit produces a power control signal in response to at least two of the plurality of first control signals. A serial circuit is coupled to receive the power control signal. The serial circuit produces the plurality of third control signals and the power control signal.

The present invention provides an affirmative indication of the presence of data signals within the frame. Computation time and power are conserved, and a link margin gain may be obtained by using both data and pilot symbols for channel estimation, interference cancellation, signal-interference ratio determination and power control.

BRIEF DESCRIPTION OF THE DRAWINGS

A more complete understanding of the invention may be gained by reading the subsequent detailed description with reference to the drawings wherein:

FIG. 4 is a diagram showing an embodiment of UDI symbols in a time frame; and

FIG. 5 is a diagram showing another embodiment of UDI symbols in a time frame.

DETAILED DESCRIPTION OF THE PREFERRED EMBODIMENTS

Figure 1:
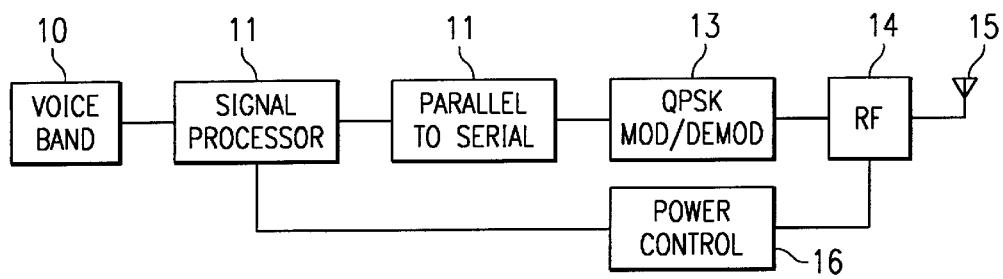
FIG. 1 is a simplified block diagram of a typical cellular phone.

Referring to FIG. 1, there is a simplified block diagram of a typical cellular phone. A data reception or downlink operation begins when data is received by antenna 15 and amplified by RF circuit 14. The amplified data is demodulated by the QPSK demodulator 13. A signal processor receives the serial stream of demodulated data including pilot symbols and transmit power control (TPC) symbols in a serial circuit (not shown). The signal processor processes the data to provide a channel estimate, correct phase and magnitude of the data signal and relay the data signal to the voice band circuit 10.

A data transmission or uplink operation proceeds in the reverse order. The signal processor 11 receives data signals from the voice band circuit. The signal processor then loads these data signals into a serial circuit 12 together with pilot symbols, TPC symbols and other control signals. These TPC symbols are power control signals that are calculated in response to previously received pilot symbols. They are transmitted in the uplink operation to alert a remote station to increase or decrease transmission power. The serial circuit 12 produces these signals in a predetermined time frame as will be described in detail. The data signals are then modulated by the QPSK modulator circuit 13. The modulated signal is then amplified by RF circuit 14 and transmitted by antenna 15. Power of the RF transmitter is controlled by power control circuit 16 in response to TPC symbols that were previously received from the remote station during the downlink operation.

Figure 2:
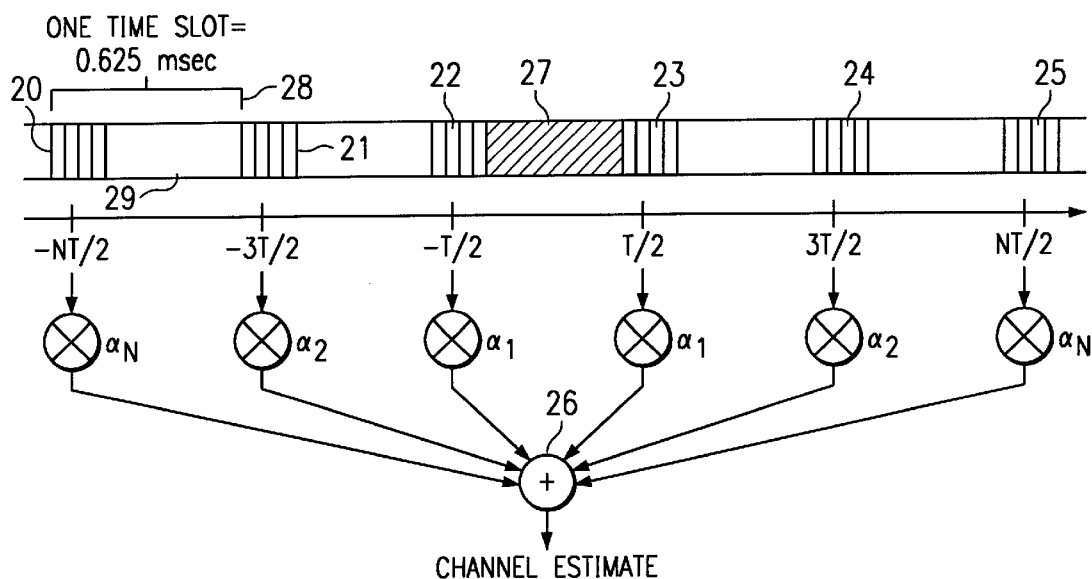
FIG. 2 is a diagram showing the WMSA method of channel estimation.

Turning now to FIG. 2, there is a diagram showing the weighted multi-slot averaging (WMSA) method of channel estimation. In operation, the signal processor circuit 11 receives individual frames of data having a predetermined time period of preferably 10 miliseconds. Each frame is subdivided into sixteen equal time slots of 0.625 milliseconds each. Each time slot, for example time slot 28, includes a respective set of pilot symbols 20, data symbols 29, a TPC symbol (not shown) and control symbols (not shown). For a data rate of 32 K symbols per second (KSPS), for example, each time slot includes twenty symbols. The first four of these symbols are pilot symbols and the last three are control symbols. Between the pilot and control symbols are twelve data symbols such as voice data and one TPC symbol. A WMSA channel estimate of a particular time slot, for example time slot 27, is determined by a weighted average of N sets of pilot symbols 20–22 before and N sets of pilot symbols 23–25 after the time slot of interest. Preferable parameters for this WMSA estimate are given in Table I. These pilot symbols 20–25 are multiplied by their respective weighting constants $\alpha_1$–$\alpha_N$ and summed by circuit 26 to provide a channel estimate.

Figure 3:
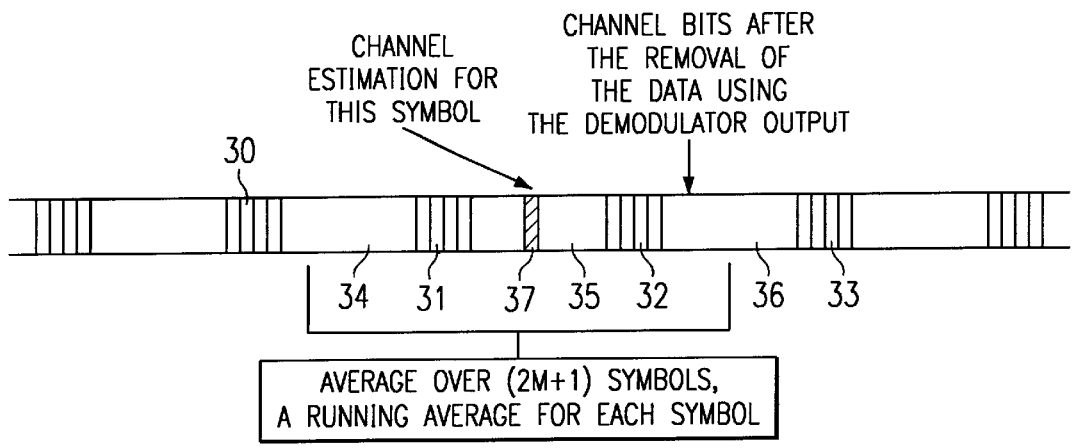
FIG. 3 is a diagram showing the ICE method of channel estimation.

The diagram of FIG. 3 shows an iterative channel estimation (ICE) method as described in copending Provisional U.S. Patent Application No. 60/082,671. The ICE method begins with an initial channel estimate as previously described. Preferable parameters for this first ICE are given in Table I. This initial channel estimate is used to correct errors in magnitude and phase of transmitted data. The corrected data may then be used rather than the pilot symbols to calculate a new channel estimate. An initial channel estimate for symbol 37, for example, is based on pilot symbols alone, including pilot symbols 30–33. This first ICE is then be used to correct data symbols 34–36 for magnitude and phase errors. A second ICE then averages the 2M+1 corrected symbols including pilot symbols, data symbols and the TPC symbol. The three control symbols in each time slot are excluded from the calculation, because in some cases they are not transmitted. This second ICE is then used to make a further correction of symbol 37. The corrected symbol 37 may then be used to perform a third ICE as shown in Table I. Preferred parameters for each ICE are given at Table I for 32 KSPS and 64 KSPS data rates over a range of Doppler frequencies.

TABLE I

| | | 32 KSPS | | 64 KSPS | |
|---|---|---|---|---|---|
| | Doppler | $\alpha_1$–$\alpha_N$ | | $\alpha_1$–$\alpha_N$ | |
| | | N | | N | |
| WMSA | 5, 80 | 3 | 1.8.3 | 3 | 1.8.3 |
| | 200, 320 | 2 | 1 .6 | 2 | 1 .6 |
| 1st ICE | 5, 80 | 3 | 1 1 1 | 3 | 1 1 1 |
| | 200, 320 | 2 | 1 .6 | 2 | 1 .6 |
| | | M | | M | |
| 2nd ICE | 5, 80 | 40 | | 80 | |
| | 200, 320 | 20 | | 40 | |
| 3rd ICE | 5, 80 | 40 | | 80 | |
| | 200, 320 | 20 | | 40 | |

Referring now to FIG. 4, there is a diagram showing an embodiment of user data identification (UDI) symbols of the present invention in a frame 49. The frame 49 includes only two pilot symbols 40–45 in each respective time slot 1–16 according to a preferred embodiment of the present invention. The first time slot of the frame includes four UDI symbols 46 following the first pilot symbols 40. These UDI symbols need not be adjacent but are preferably proximate the first set of pilot symbols. Each UDI symbol comprises two data bits as shown in Table II. The UDI symbols are all 1s when user data is present in the frame. When there is no user data present in the frame, however, the UDI symbols are all 0s. This arrangement is highly advantageous in providing an affirmative indication of a presence of user data in the frame. This affirmative indication precludes a need to correct nonexistent data and needlessly perform a CRC check. Both signal processing time and power are conserved once the UDI symbols are determined. Moreover, the presence of UDI symbols improves efficiency of the data channel when used in conjunction with only two pilot symbols in each time slot. For example, frames having four pilot symbols in each time slot for a 32 KSPS data rate are limited to twelve data symbols in each time slot or one hundred ninety-two data symbols in each frame. According to the present invention, the first time slot 47 has a net loss of two data symbols with two pilot symbols and four UDI symbols. The remaining fifteen time slots, however, have a net gain of two data symbols each. Thus, a preferred embodiment of the present invention provides a 14.6% increase of twenty-eight additional data symbols in each frame.

TABLE II

| | DTX | UDI | DATA ESTIMATE | CONTROL ESTIMATE |
|---|---|---|---|---|
| DATA & CONTROL | OFF | 11-11-11-11 | ICE (DATA) | ICE (DATA) |
| DATA, NO CONTROL | OFF | 11-11-11-11 | ICE (DATA) | ICE (DATA) |
| NO DATA, CONTROL | ON | 00-00-00-00 | ICE (DATA) | WMSA only |
| NO DATA, NO CONTROL | ON | 00-00-00-00 | ICE (DATA) | WMSA only |

Referring back to Table II, it is evident that ICE uses pilot symbols, data symbols and a TPC symbol for a channel estimate for user data. This ICE may be performed using the same symbols even when no data is present, since such an estimate would have no effect absent received data. An ICE of the three control symbols at the end of each time slot may also be made from pilot symbols, data symbols and a TPC symbol when data is present. An ICE may not be made, however, absent user data. This is because an erroneous channel estimate absent data might produce erroneous control symbols. When no data is present, therefore, a WMSA channel estimate based on pilot symbols alone must be made. The present invention provides a further advantage that the presence or absence of data symbols in the frame is readily determined by the UDI symbols at the beginning of the frame. Thus, where UDI symbols indicate an absence of data symbols in the frame, WMSA channel estimates are performed for control symbols. In all other cases, an ICE may be performed.

The UDI symbols are also highly advantageous in determination of the signal-interference ratio (SIR). This SIR is a measure of desired signal strength to undesired signal strength and is used to set the TPC symbol in the uplink. The TPC symbol then adjusts transmit power in the subsequent downlink. A determination of this SIR is greatly facilitated by an affirmative indication of the presence or absence of user data. Thus, SIR may be determined in the presence of UDI symbols indicating a presence of user data and safely omitted absent user data. Accuracy of the SIR, therefore is greatly improved.

The UDI symbols provide a further advantage during interference cancellation in the downlink. This cancellation is particularly important when interference is dominated by a few high power users. This is because interference cancellation may require estimation of the interference signal and subsequent cancellation from the received signal. This cancellation, however, may degrade the desired signal if the interference is due to DTX. The UDI symbols avoid this degradation by providing an affirmative indication of whether the interference signal includes user data prior to cancellation. Thus, interference cancellation is greatly improved and degradation of the desired signal is avoided.

Turning now to FIG. 5, there is a diagram showing another embodiment of UDI symbols 56 in a frame 59 with multiple time slots 57, 58. From Table II, it is evident that two pilot symbols rather than four pilot symbols have little effect for ICE since the estimate includes an average of pilot symbols, data symbols and a TPC symbol from each time slot of interest. A reversion to WMSA channel estimates for control symbols absent user data, however, provides an average of pilot symbols alone. Thus, another embodiment of the present invention includes a 3-dB increase in transmitted power for pilot symbols 50–55 when data is absent to compensate for a reduction from four pilot symbols to two pilot symbols. This increase in power maintains system performance so that the WMSA channel estimate is not degraded.

Although the invention has been described in detail with reference to its preferred embodiment, it is to be understood that this description is by way of example only and is not to be construed in a limiting sense. For example, UDI symbols need not be transmitted in the first time slot but are preferably transmitted only once in the frame proximate one set of pilot symbols. Furthermore, compensation for a reduction in pilot symbols during a WMSA channel estimate of control symbols might alternatively weigh pilot symbols more heavily during averaging. Thus, pilot symbols might be transmitted at a constant power level for either method of channel estimation.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A communication circuit, comprising:
    a processing circuit coupled to receive a plurality of first control signals, a second control signal, and a first power control signal from a source external to the communication circuit during a predetermined time, the plurality of first control signals being equally spaced apart in time, the second control signal being proximate one of the first control signals, the processing circuit producing a second power control signal in response to at least two of the plurality of first control signals; and
    a serial circuit coupled to receive the second power control signal, the serial circuit producing a plurality of third control signals and the power control signal.

2. A communication circuit as in claim 1, wherein each first control signal of the plurality of first control signals comprises a plurality of pilot symbols.

3. A communication circuit as in claim 2, wherein the plurality of pilot symbols consists of two pilot symbols.

4. A communication circuit as in claim 2, wherein each of the plurality of first control signals has a first amplitude corresponding to a first logic state of the second control signal and wherein each of the plurality of first control signals has a second amplitude corresponding to a second logic state of the second control signal.

5. A communication circuit as in claim 2, wherein the second control signal comprises plural control symbols, wherein the control symbols have a first logic state corresponding to a presence of user data during the predetermined time and wherein the control symbols have a second logic state corresponding to an absence of user data during the predetermined time.

6. A communication circuit as in claim 5, wherein the plurality of third control signals comprises a plurality of pilot symbols and wherein the second power control signal is determined by the first control signal.

7. A communication circuit as in claim 6, wherein each first control signal of said plurality of first control signals being equally spaced apart in time corresponds to a respective time slot of the predetermined time, the plural control symbols being produced during a time slot at a beginning of the predetermined time.

8. A communication circuit as in claim 5, wherein a signal-to-interference ratio is determined in response to the user data and the first logic state and wherein the signal-to-interference ratio is not determined in response to the user data and the second logic state.

9. A communication circuit as in claim 5, wherein a signal interference is at least partly cancelled in response to the first logic state and wherein the signal interference is not at least partly cancelled in response to the second logic state.

10. A communication circuit, comprising:
    a processing circuit coupled to receive a plurality of first control signals from a source external to the communication circuit, the processing circuit producing a power control signal in response to the first control signals; and
    a serial circuit coupled to receive the power control signal, the serial circuit producing a plurality of second control signals spaced apart equally in time during a predetermined time, the serial circuit producing a third control signal and the power control signal during the predetermined time, the third control signal being proximate one of the second control signals, the third control signal having a first logic state corresponding to a presence of user data during the predetermined time, the third control signal having a second logic state corresponding to an absence of user data during the predetermined time.

11. A communication circuit as in claim 10, wherein each first control signal of the plurality of first control signals comprises a plurality of pilot symbols.

12. A communication circuit as in claim 10, wherein each second control signal of the plurality of second control signals consists of two pilot symbols.

13. A communication circuit as in claim 10, wherein each second control signal of the plurality of second control signals has a first amplitude corresponding to a first logic state of the third control signal and wherein each second control signal of the plurality of second control signals has a second amplitude corresponding to a second logic state of the third control signal.

14. A communication circuit as in claim 10, wherein the third control signal comprises plural control symbols, wherein the control symbols have a first logic state corresponding to a presence of user data during the predetermined time and wherein the control symbols have a second logic state corresponding to an absence of user data during the predetermined time.

15. A communication circuit as in claim 14, wherein each second control signal of said plurality of second control signals spaced apart equally in time corresponds to a respective time slot of the predetermined time, the plural control symbols being produced during a time slot at a beginning of the predetermined time.

16. A communication circuit as in claim 14, wherein a signal-to-interference ratio is determined in response to the user data and the first logic state and wherein the signal-to-interference ratio is not determined in response to the user data and the second logic state.

17. A communication circuit as in claim 14, wherein a signal interference is at least partly cancelled in response to the first logic state and wherein the signal interference is not at least partly cancelled in response to the second logic state.

18. A method of identifying received data in a communication circuit, comprising the steps of:
   receiving a plurality of first control signals from a source external to the communication circuit during a predetermined time, each first control signal of the plurality of first control signals being equally spaced apart in time;
   receiving a second control signal having one of a first and second logic state during a first part of the predetermined time;
   determining a presence of user data signals during the predetermined time in response to the first logic state; and
   determining an absence of the user data signals during the predetermined time in response to the second logic state.

19. A method of identifying received data in a communication circuit as in claim 18, further comprising the steps of:
   averaging at least two first control signals of the plurality of first control signals and a plurality of intervening data signals in response to the first logic state; and
   averaging at least three first control signals of the plurality of first control signals in response to the second logic state.

20. A method of identifying received data in a communication circuit as in claim 18, further comprising the step of determining a signal-to-interference ratio in response to the user data and the first logic state.

21. A method of identifying received data in a communication circuit as in claim 18, further comprising the step of at least partly cancelling a signal interference in response to the first logic state.

22. A communication circuit, comprising:
   a processing circuit arranged to produce plurality of data signals; and
   a serial circuit coupled to receive the plurality of data signals, the serial circuit producing a first control signal and producing a second control signal having a first logic state corresponding to the plurality of data signals during a predetermined time, the serial circuit producing the first control signal and producing the second control signal having a second logic state corresponding to an absence of the plurality of data signals during the predetermined time.

23. A communication circuit as in claim 22, wherein the predetermined time is a time slot of a frame.

24. A communication circuit as in claim 22, wherein the first control signal comprises at least one pilot symbol.

25. A communication circuit as in claim 22, wherein the second control signal comprises at least one user data identification symbol.

26. A communication circuit as in claim 22, wherein the serial circuit produces the first control signal adjacent the second control signal in time.

27. A communication circuit as in claim 22, wherein the processing circuit determines a signal-to-interference ratio in response to the second control signal having the first logic state and wherein the processing circuit does not determine the signal-to-interference ratio in response to the second control signal having the second logic state.

28. A communication circuit as in claim 27, wherein the processing circuit produces a power control signal in response to the signal-to-interference ratio.

29. A method of identifying received data signals in a communication circuit, comprising the steps of:
   receiving a first control signal from a source external to the communication circuit;
   receiving a second control signal having one of a first and second logic state;
   determining a presence of data signals during the predetermined time in response to a first logic state; and
   determining an absence of data signals during the predetermined time in response to the second logic state.

30. A method as in claim 29, wherein the first control signal comprises a plurality of pilot symbols, the method comprising the steps of:
   averaging at least two pilot symbols of the plurality of pilot symbols and a plurality of the data signals in response to the first logic state; and
   averaging more than said at least two pilot symbols of the plurality of pilot symbols in response to the second logic state.

31. A method as in claim 29, wherein the first control signal comprises a plurality of pilot symbols and wherein the second control signal comprises a plurality of control symbols.

32. A method as in claim 29, comprising the step of determining a signal-to-interference ratio in response to the data signals and the first logic state.

33. A method as in claim 29, comprising the step of at least partly canceling a signal interference in response to the first logic state.

* * * * *